Figure 7:
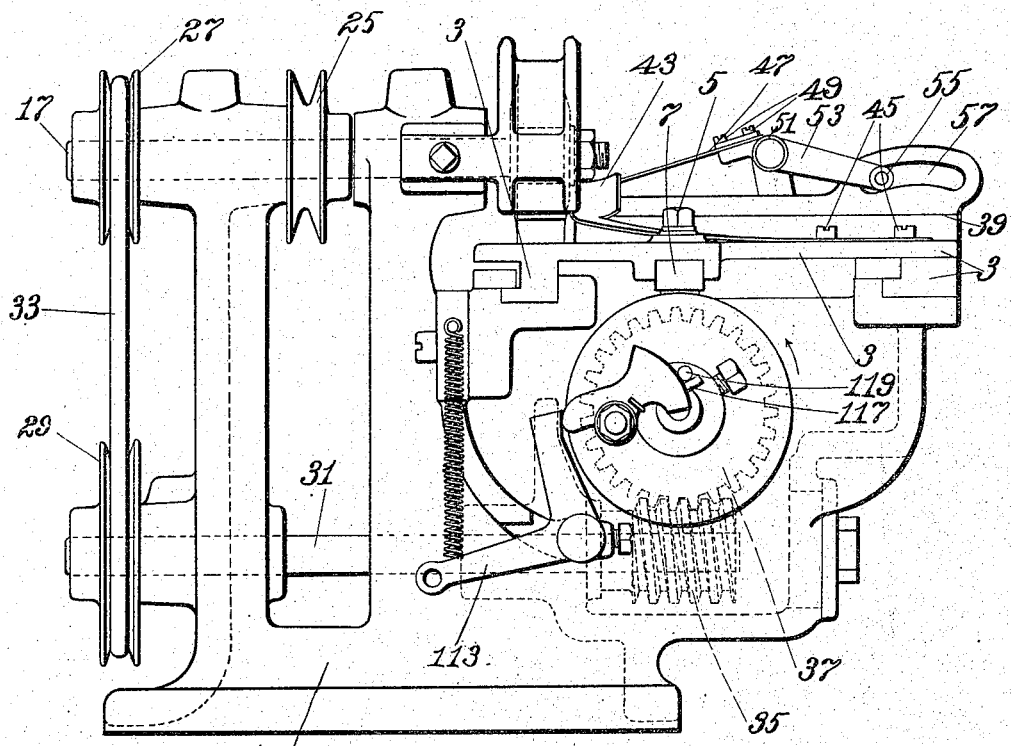

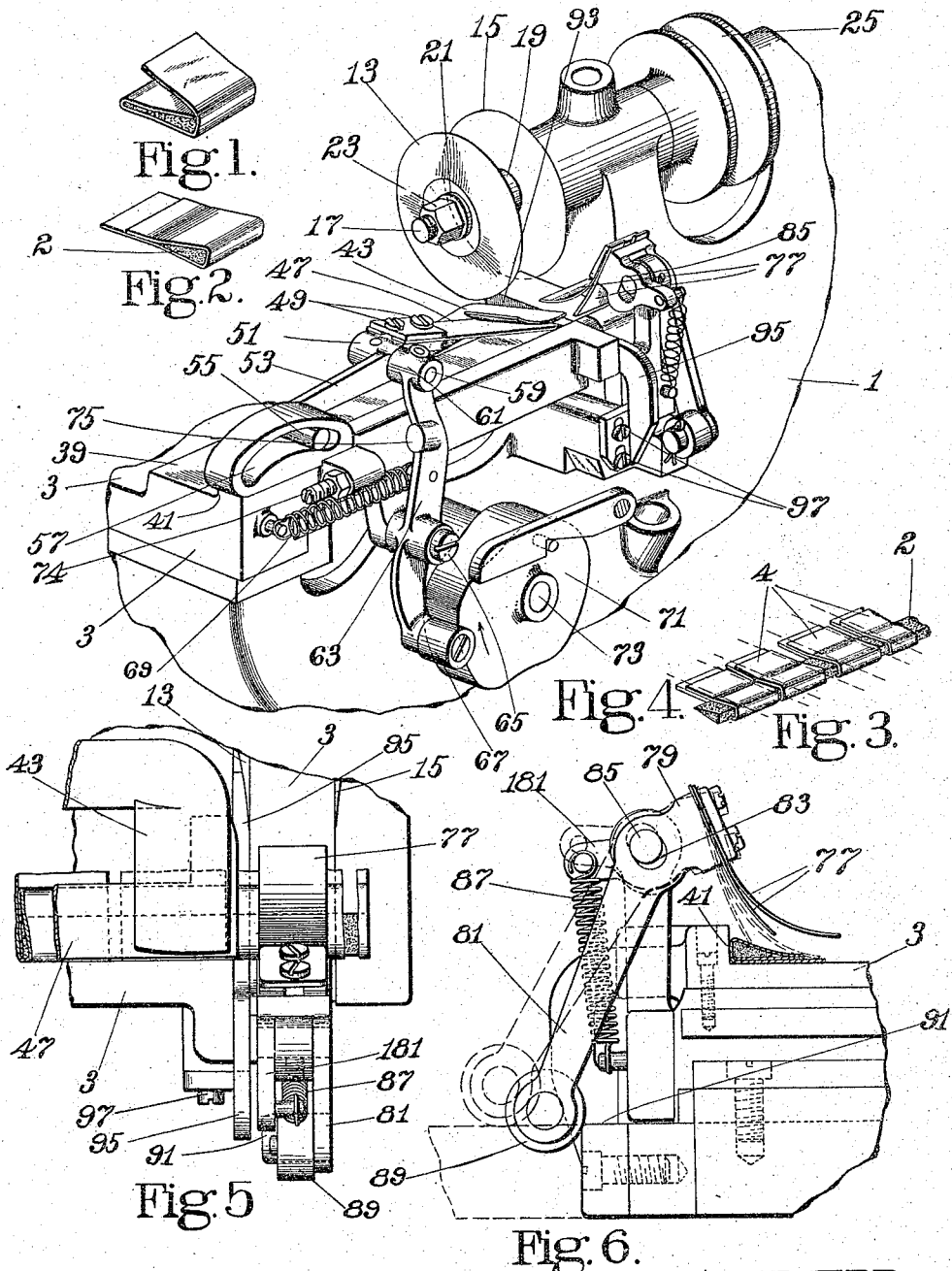

UNITED STATES PATENT OFFICE.

WILLIAM C. STEWART, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

CUTTING-MACHINE.

1,196,896.   Specification of Letters Patent.   Patented Sept. 5, 1916.

Application filed October 2, 1914. Serial No. 864,673.

*To all whom it may concern:*

Be it known that I, WILLIAM C. STEWART, a subject of the King of England, residing at Swampscott, in the county of Essex and State of Massachusetts, have invented certain Improvements in Cutting-Machines, of which the following description, in connection with the accompanying drawings, is a specification, like reference characters on the drawings indicating like parts in the several figures.

This invention relates to cutting machines and is herein illustrated in connection with a machine for cutting from a strip of prepared material a series of articles. In the manufacture for boots and shoes of pull-on devices, such as those shown in United States Patents Nos. 1,049,721 and 1,059,695 it is customary to prepare a strip of material by wrapping a plurality of short pieces of upper leather of rectangular outline about a common core of sole leather or felt which is triangular in cross-section, and then to cut one by one from the strip of material thus prepared the finished pull-on devices.

The present invention is illustrated in connection with a machine for performing this cutting operation and consists in certain details of construction and combinations of parts which will be described in connection with an illustrative machine and pointed out in the appended claims.

Figure 8:
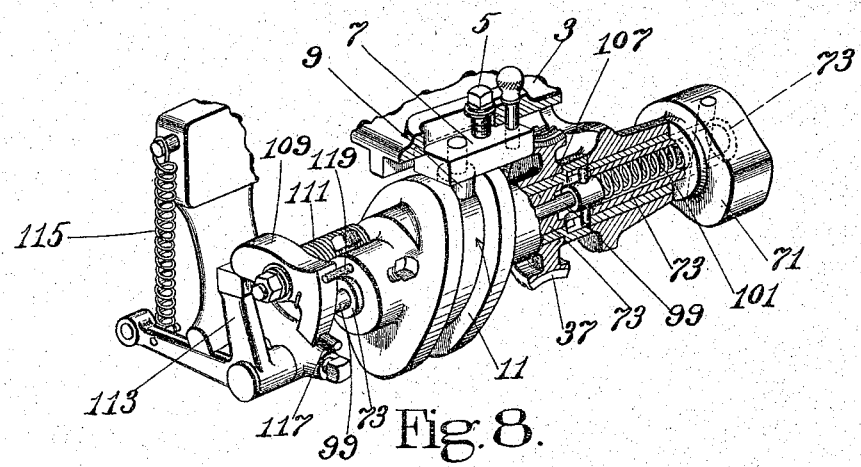
Figure 9:
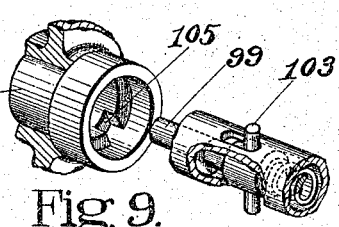

Referring to the accompanying drawings,—Figure 1 is a perspective of a pull-on device like that shown in Patent No. 1,059,695; Fig. 2 is a perspective of a pull-on device like that of Patent No. 1,049,721; Fig. 3 is a perspective of a portion of a strip of material from which the device of Fig. 2 is to be cut; Fig. 4 is a perspective of a portion of a machine in which the present invention is embodied; Fig. 5 is a detail plan view of a portion of the mechanism for feeding and clamping the strip of material; Fig. 6 is an elevation of a portion of the machine showing more particularly the mechanism for clamping the strip upon its support; Fig. 7 is a rear elevation of the machine; Figs. 8 and 9 are detail perspectives of the clutch mechanism.

Before describing the construction of the machine in detail a brief description of the function which it performs will be given. Referring particularly to Figs. 2 and 3, about a core 2, herein shown as felt, are wrapped a plurality of small pieces of thin leather 4, said pieces being attached to said core by cement. These pieces of leather 4 are not absolutely uniform in size nor are they spaced uniformly along the core 2. The purpose of the present machine is to cut through the pieces of upper leather 4 and the core 2 on the dotted lines indicated in Fig. 3 so as to produce the finished article illustrated in Fig. 2. The pull-on device illustrated in Fig. 1 differs from that in Fig. 2 merely in the manner in which it is wrapped about the core 2. Obviously the same cutting machine would be used in the manufacture of both of these pull-on devices. In the illustrated machine a strip of material such as that shown in Fig. 3 is fed over a support until the most forward piece 4 is in front of a plurality of spaced knives. This piece 4 is then clamped to the support and the support caused to reciprocate.

Mounted in suitable ways in the frame 1 of the machine is a sliding work support or table 3 to which is fastened by means of a screw bolt 5 a block 7 having rotatably mounted therein the stem of the roll 9, said roll running in a groove in a cam 11 of the shape shown in Fig. 8 so that rotation of said cam causes reciprocation of said work support. As best shown in Fig. 8, the work support 3 is provided with a slot through which the bolt 5 extends so that adjustment of said support relative to said block is possible. The cutting members herein shown as two rotary disk knives 13, 15 (see Fig. 4) are fast to one end of a driving shaft 17, said knives being separated by a sleeve 19 and being held in place by a washer 21 and a nut 23, the latter being threaded on the reduced end of the shaft 17. Near the center of the shaft is a pulley 25 to receive power, and at its outer end is a pulley 27. Around this latter pulley and around a pulley 29 fast to a counter shaft 31 passes a belt 33 by which power is transmitted to said counter shaft. This counter shaft carries a worm 35 meshing with a gear 37 which may be connected by mechanism presently to be described with the cam 11 so as to cause the work table 3 to be moved to and fro in a direction perpendicular to the axis of the shaft 17 on which the knives 13 and 15 are mounted so as to carry the strip of material first into position to have a finished article cut therefrom and then back into the position best shown in Fig. 4 preparatory to feeding the work in a direction parallel to the axis of the shaft 17.

The feeding of the forward end of the material to bring it in front of the knives and the holding of it during the cutting operation are accomplished by the following mechanism: Referring more particularly to Fig. 4 and considering first the mechanism for feeding the material over the support, said support is provided with a raised flat bed 39 to receive the material and with a shouldered portion 41 to serve as a guide for one edge. A resilient presser 43 fastened to the support or table 3 by screws 45 (see Fig. 7) exerts a moderate pressure upon the material at all times, its purpose being to hold the work from being moved rearwardly when the feeding member, presently to be described, is retracted but at the same time to permit forward feeding of said material. The feeding member or finger 47 consists of a flat resilient strip of metal fastened by screws 49 to the hub 51 of a link 53 having at its end a pin 55 arranged to travel in a segmental slot 57 formed in a boss which rises from the edge of the support 3. Upon the same pin 59 upon which the hub 51 is mounted is a hub 61 of a lever 63 pivoted at 65 to the table 3 and carrying at its lower end a roll 67. A spring 69, arranged as shown in Fig. 4, tends to hold this roll at all times except as will presently appear, when the two parts are not in register, in contact with a cam 71 mounted upon the same shaft 73 as is the cam 11 which has been referred to above. The cam 71 has a high or operative portion and a low or inoperative portion, the first-named portion being shown in Fig. 4 in contact with the roll 67. When the table 3 reciprocates, the lever 63 reciprocates with it so that the roll 67 is alternately in and out of register with the cam 71. In order to prevent the end of this roll from striking the cam when the table returns to the position shown in Fig. 4, the set screw 74 carried by a lug on the table 3 is arranged to contact with a boss 75 on the lever 63, the set screw being adjusted so as to hold the roll 67 away from the shaft 73 a distance greater than the length of the radius of curvature of the inoperative portion of the cam 71. Consequently only the higher portion of said cam comes into contact with the roll and during this contact moves the finger 47 forwardly to push the end of the strip of material in front of the knives 13, 15. It should be noted that the set screw 74 may be adjusted to vary the extent of the feeding movement of the finger 47.

In order to hold the end of the material firmly during the cutting operation a work holder 77, herein shown as two resilient strips of sheet metal, is fast to the hub 79 of a lever 81, said lever having a slot 83 to receive a pin 85 carried by an upright extension of the support or table 3. A spring 87 connects an arm 181 on the hub 79 with the table 3 whereby the work holder or clamp 77 is normally held in raised position. In order to bring the work holder 77 down upon the work so as to clamp it to the table, the lower end of the lever 81 carries a roll 89 which, when the table 3 is reciprocated to present the work to the knives, rides up on a track 91 thereby swinging the clamp 77 and its associated parts from the full line position to the dotted line position indicated in Fig. 6. It should be noted that the spring 87 tends to hold the upper end of the slot 63 in contact with the pin 85 but that when the roll 89 is raised the lower end of said slot is in contact with the pin. The purpose of imparting this movement to the hub 79 is to cause the clamping member 77 to hold firmly against the shoulder 41 that portion of the strip of material which is being operated upon by the knives.

For the purpose of making a clean cut through the material the lower portions of the knives 13 and 15 extend below the surface of the table 3, one of said knives extending into a slot 93 in said table and the other running close to the end of said table. If, however, this slot 93 were open at the side of the work holder or clamp 77, the end of the strip of material as it was fed forward would be liable to drop slightly into this slot and come into contact with its forward wall. To prevent this the slot is filled at this portion by a member 95 whch is adjustably fastened by screws 97 to the machine frame.

Referring now more particularly to Figs. 8 and 9, the mechanism for connecting the shaft 31 at will with the cam 11 will be described. The shaft 73 to which the cams 11 and 71 are fast is hollow to receive a rod 99, said rod being urged at all times toward the left as viewed in Fig. 8 by a spring 101. An enlarged end of the rod 99 carries a pin 103 which is adapted to enter sockets 105 in a bushing 107 to which the gear 37 is fast. With the mechanism thus far described the spring 101 would hold the ends of the pin 103 at all times in the sockets 115 whereby the cam 11 would be rotated continuously. In order to control the operation of this rod 99 a cam 109 is normally held against the tension of a spring 111 in the position indicated in Fig. 8 by the end of a bell crank lever 113, said bell crank lever in turn being held in position shown by a spring 115. When now the bell crank lever is moved by means of a treadle, for example, into the position shown in Fig. 7, the spring 111 moves the cam 109 into the position shown thereby presenting its thinner portion in front of the rod 99 so that said rod is moved outwardly by the spring 101 and the cam 11 rotated. In order to limit the angular movement of the cam 109 a pin 117 on said cam contacts with a pin 119 which is carried as is the cam 109 by the hub of the cam 11. As long, therefore, as the treadle is depressed the cam 11 will continue to rotate, but as soon as the treadle is released the upper arm of the bell crank lever 113 will contact with the tail of the cam 109 and move it into the position shown in Fig. 8.

Referring again to Fig. 4 the pivot 59 of course rises and falls to an extent when the lever 63 is oscillated. The purpose of the slot 57 and pin 55 is to counteract the effect of this movement on the operative end of the feeding member 47 and to cause said end to travel in an approximately horizontal path.

It is believed that the operation of the machine will be clear from the description of the construction of its various parts which have been given above. It should be noted that the machine is caused to run continuously until an entire strip of material has been cut up after which it is brought to rest to permit the insertion of a new strip.

Although the invention has been described in connection with a particular machine it should be understood that the invention is not limited in the scope of its application to the particular machine shown and described.

Having now described my invention, I claim as new and desire to secure by Letters Patent of the United States:

1. A cutting machine having, in combination, a cutting member, a support for the work, means for alternately feeding the work over the support and for moving the support toward and from the cutting member, and automatic means for clamping the work to the support at the beginning of the movement of the support toward the cutting member.

2. A cutting machine having, in combination, a support for the work, a cutting member, a reciprocating member for feeding the work to bring a portion of it in front of said cutting member, means for preventing retraction of said work when said feeding means is retracted, means for reciprocating said support to cause the cutting member to act upon the work, and automatic means for clamping the work to the support during the cutting operation.

3. Means for feeding a strip of material comprising a support for said strip, a feeding member adapted to engage said strip, a hub to which said member is fast, a link fast at one end to said hub, means for confining the other end of said link to movement in a curved path, and means for oscillating said hub.

4. Means for feeding a strip of blanks mounted in spaced relation upon a common core comprising a support for said strip, a resilient feeding member adapted to engage the edges of the blanks one by one, a hub to which said member is fast, a link fast at one end to said hub, means for confining the other end of said link to movement in a curved path and means for oscillating said hub.

5. Means for clamping a piece of work upon a slidable support comprising a pivot carried by said support, a hub having a slot to receive said pivot loosely, a clamping member fast to said hub, a spring normally holding the clamping member raised and one end of the slot in contact with said pivot, and means becoming operative upon the sliding movement of said support for bringing the other end of said slot into contact with said pivot and said clamping member down upon the work.

6. A machine for cutting a series of articles from a series of blanks mounted in spaced relation upon a common core, having, in combination, a plurality of cutting members spaced apart a distance equal to that of the finished article, means for engaging the blanks one at a time and feeding all of them forward a predetermined distance, and means for causing relative movement between said cutting members and said blanks and core in a direction at an angle to the feeding movement but in the same plane to cause the cutting members to enter a blank.

7. A machine for operating upon a series of blanks mounted in spaced relation upon a common core, having, in combination, a support for said series of blanks, a cutting member, and means for feeding said series in two directions, first to bring one member of the series in front of the cutting member and then to cause said member to sever a blank.

8. A machine for operating upon a series of blanks mounted in spaced relation upon a common core, having, in combination, a support for a strip of blanks, two cutters for operating upon the blanks, means for feeding the strip intermittently over the support to bring a selected blank in front of the cutters, means for clamping said selected blank to said support, and means for causing relative reciprocation of said support and cutters.

9. A machine for operating upon a series of blanks mounted in spaced relation upon a common core, having, in combination, a support for a strip of blanks, two cutters for operating upon the blanks, means for feeding the strip intermittently over the support to bring a selected blank in front of the cutters, means for causing relative reciprocation of said support and cutters to cause said cutters to act upon said blank, and automatic means operated by said reciprocation for clamping said blank to said support during the cutting operation and for releasing said blank at the end of the reciprocation to permit the next feeding movement to take place.

In testimony whereof I have signed my name to this specification in the presence of two subscribing witnesses.

WILLIAM C. STEWART.

Witnesses:
 ERIC A. HOLMGREN,
 HAROLD E. KENYON.

Copies of this patent may be obtained for five cents each, by addressing the "Commissioner of Patents, Washington, D. C."